Dec. 9, 1941. J. W. GREIG 2,265,901
SEAT STRUCTURE FOR VEHICLES
Filed Dec. 22, 1938 3 Sheets-Sheet 1
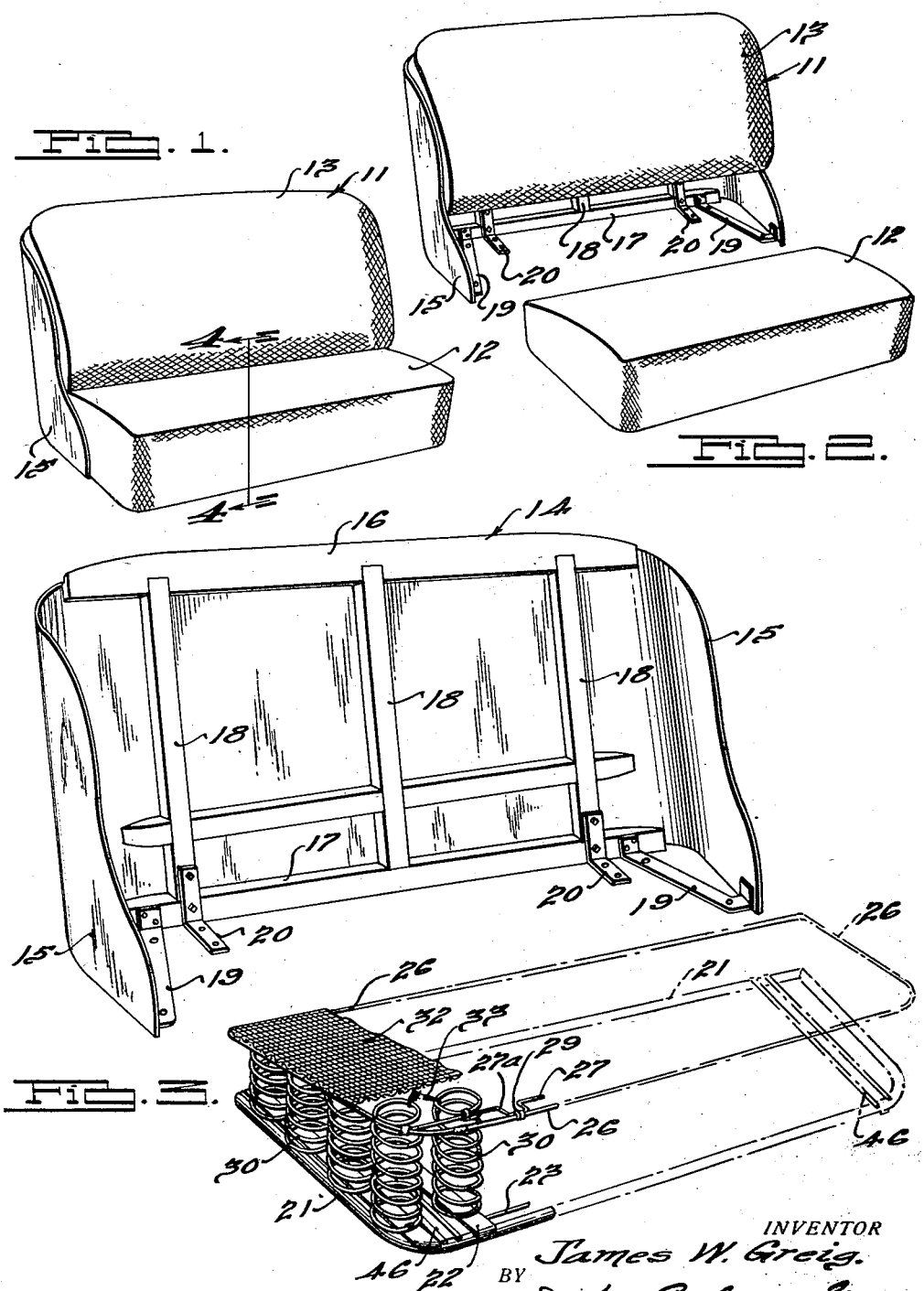
INVENTOR
James W. Greig.
BY Dike, Calver & Gray
ATTORNEYS.

Dec. 9, 1941.   J. W. GREIG   2,265,901
SEAT STRUCTURE FOR VEHICLES
Filed Dec. 22, 1938   3 Sheets-Sheet 2
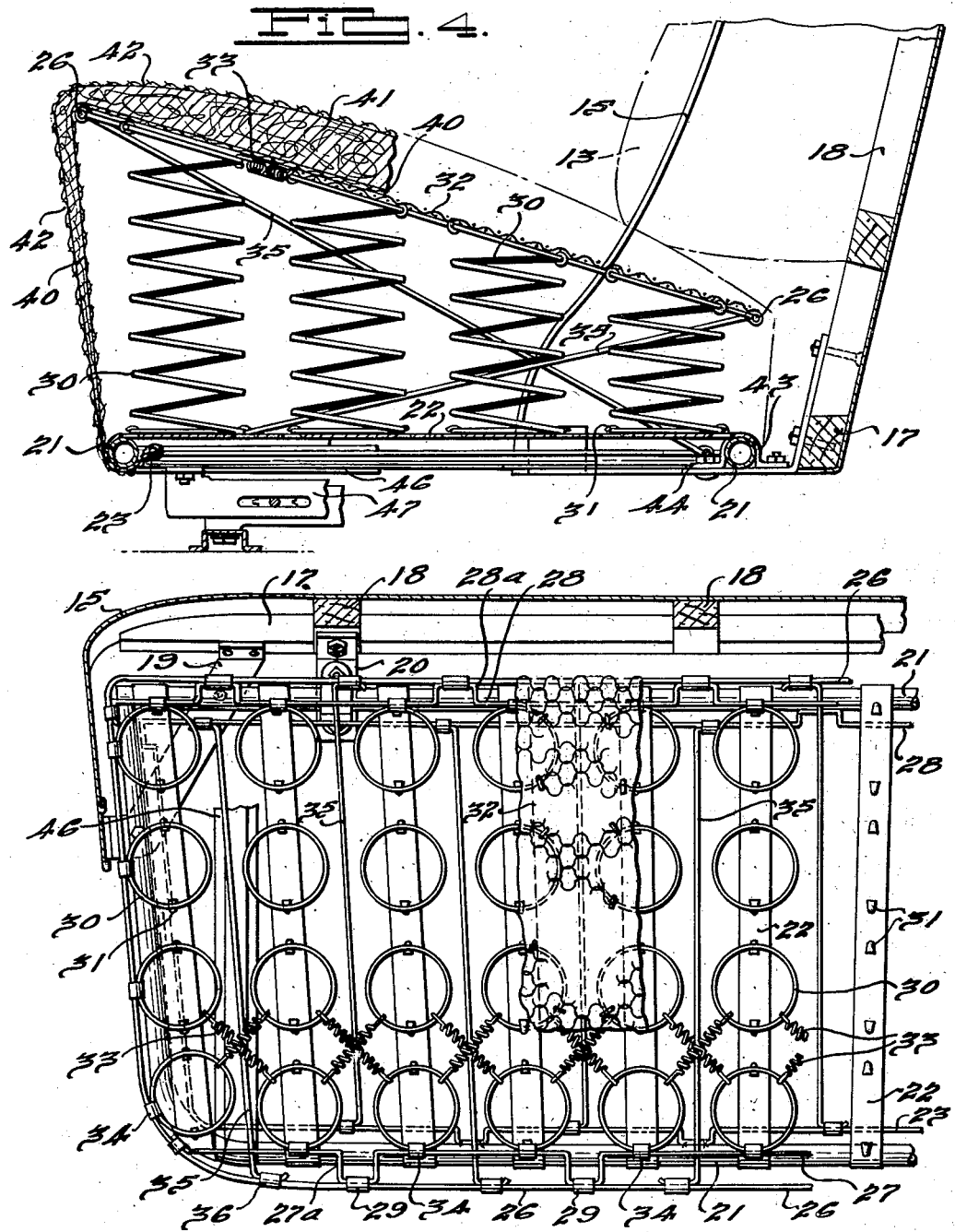
INVENTOR
James W. Greig.
BY Dike, Calver & Gray
ATTORNEYS.

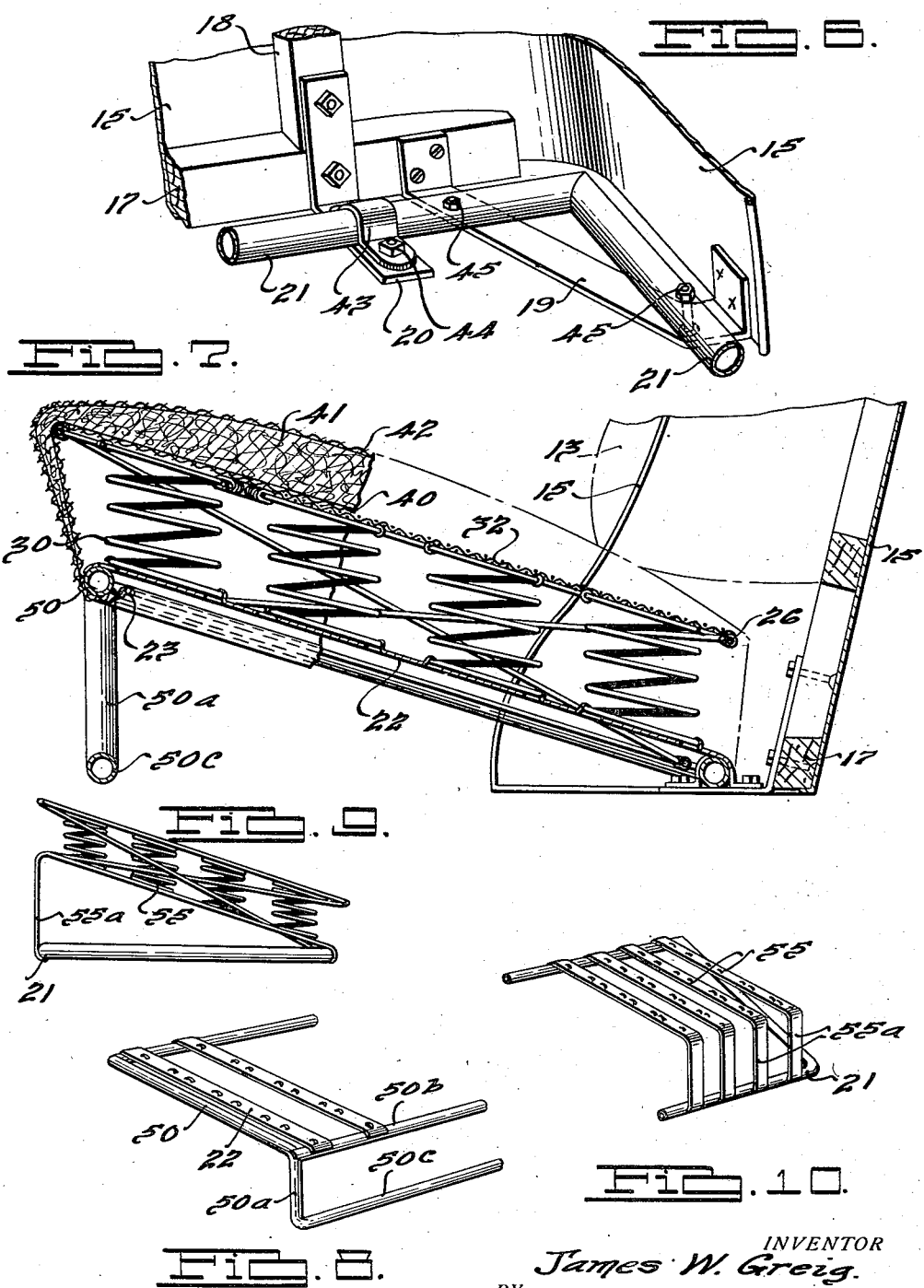

Patented Dec. 9, 1941

2,265,901

UNITED STATES PATENT OFFICE 2,265,901

SEAT STRUCTURE FOR VEHICLES

James W. Greig, Grosse Pointe Park, Mich., assignor to Hudson Motor Car Company, Detroit, Mich., a corporation of Michigan Application December 22, 1938, Serial No. 247,248

6 Claims. (Cl. 155—194)

This invention relates to seat structures and more particularly to seat structures for motor vehicles.

Heretofore it has been a common practice to construct seat structures for motor vehicles substantially in two units: a sustaining structure usually including an upholstered back rest, and often a seat pan or base frame, and an upholstered cushion mounted on said pan or frame and often secured thereto. Cushions have heretofore been constructed to comprise a wooden frame to which the metal springs, padding and the upholstery are assembled.

Cushions constructed as above explained, whether mounted loose on the base frame of the seat structure or secured to such frame or to the back rest, proved to be a source of danger in a vehicle body. In cases of accidents instead of bending as is the case with metal members, the cushion wooden frames break very easily, and sharp splinters produced by such breaking often cause serious body injuries to occupants. Such breaking of cushion wooden frames is particularly common in seat structures with rigidly fixed cushions. At the same time loosely mounted cushions are easily dislodged from their supports, which is objectionable, and are difficult to force back into place.

In spite of the above disadvantages, elimination of cushion wooden frames has been considered impractical, since such frames provide foundation around which the entire cushion is constructed and assembled in the manufacture thereof.

One of the objects of the present invention is to provide an improved seat structure in which the separate wooden base frame for the spring seat is eliminated, the back seat and the spring seat cushion being directly joined together to provide a strong single unit.

Another object of the invention is to provide an improved cushion which has a spring structure possessing sufficient strength and is adapted to perform the functions performed in conventional cushions by wooden frames.

Another object of the invention is to provide a seat construction for a motor vehicle, which is improved in its construction, and yet is cheaper to manufacture and is considerably lighter than conventional seat structures.

A further object of the invention is to provide a seat structure for a vehicle, such as an automobile, comprising two major units in which the upholstered spring seat cushion forms a metal structural member secured directly to the back rest frame.

It is an added object of the present invention to provide an improved seat structure of the foregoing character which is simple and relatively light in construction, is safe and dependable in use, and is relatively inexpensive to manufacture.

Other objects of this invention will appear in the following description and appended claims, reference being had to the accompanying drawings forming a part of this specification wherein like reference characters designate corresponding parts in the several views.

Fig. 1 is a perspective view illustrating a vehicle seat structure embodying the present invention.

Fig. 2 is a view similar in part to Fig. 1, the lower cushion being shown removed.

Fig. 3 shows the back rest without the upper cushion, and the lower cushion disconnected from the back rest with the upholstery and padding removed.

Fig. 4 is a sectional view taken in the direction of the arrows on the section plane passing through the line 4—4 of Fig. 1.

Fig. 5 is a top view partly in section showing part of the structure, the upper cushion being removed, and the lower cushion being put in place without the upholstery and the padding.

Fig. 6 is a fragmentary perspective view illustrating the means for securing the lower cushion to the back rest.

Fig. 7 is a vertical sectional view similar in part to Fig. 4 and illustrating a modified type of the lower cushion frame.

Fig. 8 is a perspective view illustrating separately the frame of the structure of Fig. 7.

Fig. 9 is a sectional view similar in part to Fig. 4 and illustrating a modified construction of the spring structure of the lower cushion.

Fig. 10 is a fragmentary perspective view illustrating the lower tubular frame and the spring supporting strips of the structure shown in Fig. 9.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are shown, by way of example, vehicle seat structures constructed in accordance with certain embodiments of the present invention. Referring to the drawings and particularly to Figs. 1 and 2, the structure shown therein comprises generally a back rest 11, the lower cushion 12, and means for securing the same together. The back rest and the cushion are so constructed that each of them may be manufactured separately and assembled together after each of them is completed. When assembled together the back rest and the lower cushion provide a single unit. When assembled in a vehicle, the lower cushion is not removable and it remains firmly in its place.

The back rest comprises an upright frame comprising a skeleton, generally indicated by the numeral 14, which may be enclosed by a sheet 15 made of a hard relatively stiff material such, for instance, as fiber covered with a suitable trim fabric. Carried by the back rest frame is an upholstered spring cushion 13 which terminates above the bottom of the frame to provide a space for housing the rear portion of the seat cushion unit. The skeleton 14 comprises two horizontal members 16 and 17 connected by means of vertical bars 18. A bracket 19 is provided at each corner of the skeleton for increasing the rigidity of connection of the skeleton frame and the sheet 15. Said bracket is also used for increasing the strength of connection of the lower cushion 12 to the back rest 11. At the place of juncture of the more remotely located vertical posts 18 and the lower frame member 17 there are secured two angle brackets 20 for connecting the back rest and the lower cushion unit together.

The lower cushion unit 12 comprises a light metal frame 21 preferably of a tubular cross section, which frame possesses sufficient strength to provide a skeleton frame for the cushion 12. To the tubular frame 21 there is secured in any suitable manner, such as by spot welding, a plurality of transversely extending spring supporting strips 22. Within the frame 21 there is provided a wire trim frame 23 secured to the tubular frame in any suitable manner, such as by means of spot welding. The tubular frame 21, the spring supporting strips 22 and the trim frame 23 form the lower part of the cushion on which the remaining cushion structure is built.

The upper portion of the cushion spring structure includes an upper border wire 26 bent to form a frame conforming to the shape of the cushion. Along the front and the rear of said border wire frame and inwardly thereof there are provided two arch wires 27 and 28. The arch wires are bent to form rectangular portions 27a and 28a extending toward the border wire to which they are connected by means of clips 29. The arch wires make the border wire frame more stiff in transverse direction without substantially increasing the weight thereof.

A plurality of coil springs 30 are arranged on the spring supporting strips 22, which strips are punched out to provide spring retaining tongues 31. The coil springs 30 are ordinarily arranged to form a plurality of longitudinal rows, in the present instance four, and a plurality of transverse rows. The tops of the coil springs 30 are connected by means of a wire mesh sheet 32 covering all of the coil springs with the exception of the front row. The wire mesh sheet 32 serves also as a pad support. Since the sheet 32 is substantially non-stretchable, it does not cover the entire top portion of the spring structure. The front row of coil springs 30 is connected to the adjacent row by means of bracer coil springs 33 provided in cross arrangement between each four adjacent coil springs 30 as is best shown in Fig. 3. By virtue of such a construction a more yieldable spring structure is produced. The coil springs 30 adjacent the upper border wire, or arch wires connected thereto, are fastened to said border wire or arch wires with the aid of clips 34.

A plurality of diagonal braces 35 is provided for increasing the strength of the spring structure, said diagonal brace wires extending transversely of the cushion. Approximately one-half of said diagonal braces have their upper ends connected by means of clips 36 to the front portion of the border wire 26, while their lower ends are connected in a similar manner to the rear portion of the trim frame 23. The other half of said braces have their upper ends connected to the rear portion of the upper border wire, while their lower ends are secured to the front portion of the trim frame 23.

A cloth cover 40 secured to the rear portion of the upper border wire covers the entire top, the front and the ends of the spring structure and is secured at the bottom thereof to the trim frame 23. Over said cloth cover 40 is arranged a padding 41 shaped to provide a desired form and degree of softness of the cushion. The padding is covered with an upholstery cloth 42 covering the entire lower cushion with the exception of the bottom thereof which remains open in order to make the spring structure accessible from the bottom of the cushion. The edges of the upholstery cloth 42 are secured to the trim frame 23.

The means for attaching the lower cushion to the back rest are illustrated in detail in Figs. 2, 3 and 6. For connecting the lower cushion to the back rest the same is arranged to have the corners of the tubular frame 21 bear directly upon the brackets 19 and 20. The tubular frame is connected to each bracket 20 by means of a clamp 43 held to the bracket with the aid of bolts and nuts 44. The brackets 19 and the tubular frame 21 are connected together by means of bolts 45 passing through the tubing of the frame and the brackets.

As shown in Figs. 3 and 4 two channel members 46 are secured to the lower tubular frame 21 to which channels there are secured in a manner well known in the art slide members 47 cooperating with longitudinal guide tracks secured to the floor of the vehicle, this construction permitting the seat structure to be adjusted longitudinally upon the floor as may be desired by the occupant of the vehicle. A detailed description of the seat adjusting means is omitted since the same per se does not form a part of the invention herein claimed.

From an examination of Fig. 4 it will be readily seen that the springs 30 differ in length or number of coils and they are higher at the front of the cushion in order to give the desired slope toward the rear of the vehicle. Figs. 7 and 8 illustrate one modification whereby such slope is produced with coil springs of substantially equal length. As can be clearly seen from an examination of said figures, the tubular frame corresponding to frame 21, designated in the present instance by the numeral 50, is bent to provide front depending leg portions 50a. A transverse tubular member 50b connects the ends of the frame 50 at the downward bends thereof and serves as a front bar of the tubular frame to which the front ends of the spring supporting strips 22 are secured. The transverse portion 50c connects the legs 50a together and rests against the floor of the vehicle. By virtue of such a construction the lower and the upper portions of the spring structure of the cushion are made substantially parallel which permits the use of coil springs which are substantially of equal length.

Figs. 9 and 10 illustrate another modification with the aid of which the same results are attained. In this embodiment there are provided spring supporting strips 55 bent to form leg portions 55a. By assembling the spring structures on such strips, the coil springs similar to those used in the structure illustrated in Fig. 7 may be used.

I claim:

1. In a seat structure, a back rest comprising an upright skeleton frame including upper and lower transverse members connected together, a relatively rigid generally U-shaped sheet enclosing said frame and having forwardly extending upright end portions, forwardly extending brace members connecting the lower transverse frame member with the forward ends of said sheet, brackets secured to the lower portion of said frame intermediate said brace members, and means for detachably connecting a unitary cushioned seat base frame to said brackets and brace members.

2. In a seat structure, a back rest comprising an upright skeleton frame including upper and lower transverse members connected together, a relatively rigid generally U-shaped sheet enclosing said frame and having forwardly extending upright end portions, a pair of forwardly extending brace members connecting the lower transverse frame member with the forward ends of said sheet, a pair of brackets secured to the lower portion of said frame intermediate said brace members, and means for detachably connecting a unitary cushioned seat base frame to said brackets and brace members at four points.

3. In a seat structure, a back rest comprising an upright skeleton frame including upper and lower transverse members connected together, a relatively rigid generally U-shaped sheet enclosing said frame and having forwardly extending upright end portions, forwardly extending brace members connecting the lower transverse frame member with the forward ends of said sheet, brackets secured to the lower portion of said frame intermediate said brace members, and means for detachably connecting a unitary cushioned seat base frame to said brackets and also to said brace members at longitudinally spaced points.

4. In a seat structure, a back rest comprising an upright skeleton frame including upper and lower transverse members connected together, a relatively rigid generally U-shaped sheet enclosing said frame and having forwardly extending upright end portions, forwardly extending brace members connecting the lower transverse frame member with the forward ends of said sheet, brackets secured to the lower portion of said frame intermediate said brace members, a unitary cushioned seat having a base frame, means for detachably connecting said base frame to said brackets, and means for detachably connecting said base frame to said braces at points located forwardly of said first named connecting means.

5. In a seat structure, a back rest comprising an upright skeleton frame including upper and lower connected transverse members, a relatively rigid generally U-shaped sheet embracing said frame and having end portions extended forwardly at the sides of the seat, forwardly extending diverging brace members connecting the lower portion of said frame to said end portions at points located forwardly of said frame, a unitary cushioned seat having a base frame, means for detachably connecting said base frame to said brace members at points located forwardly of said skeleton frame, and means for connecting said base frame to said lower transverse member at points located intermediate said brace members.

6. In a seat structure, a back rest comprising an upright skeleton frame including upper and lower connected transverse members, a relatively rigid generally U-shaped sheet embracing said frame and having end portions extended forwardly at the sides of the seat, forwardly extending diverging brace members connecting the lower portion of said frame to said end portions at points located forwardly of said frame, brackets secured to the lower portion of said skeleton frame intermediate said brace members, a unitary cushioned seat having a base frame, and means for detachably connecting said base frame to said brackets and to said brace members at longitudinally spaced points.

JAMES W. GREIG.